(12) United States Patent
Muessig

(10) Patent No.: US 12,515,054 B2
(45) Date of Patent: Jan. 6, 2026

(54) LEADLESS CARDIAC PACEMAKER DEVICE CONFIGURED TO PROVIDE INTRA-CARDIAC PACING

(71) Applicant: BIOTRONIK SE & Co. KG, Berlin (DE)

(72) Inventor: Dirk Muessig, West Linn, OR (US)

(73) Assignee: BIOTRIONIK SE & Co. KG, Berlin (DE)

( * ) Notice: Subject to any disclaimer, the term of this patent is extended or adjusted under 35 U.S.C. 154(b) by 232 days.

(21) Appl. No.: 16/933,459

(22) Filed: Jul. 20, 2020

(65) Prior Publication Data

US 2021/0023377 A1 Jan. 28, 2021

Related U.S. Application Data

(60) Provisional application No. 62/878,762, filed on Jul. 26, 2019.

(51) Int. Cl.
*A61N 1/365* (2006.01)
*A61N 1/05* (2006.01)
*A61N 1/375* (2006.01)

(52) U.S. Cl.
CPC ....... *A61N 1/36585* (2013.01); *A61N 1/0587* (2013.01); *A61N 1/36542* (2013.01);
(Continued)

(58) Field of Classification Search
CPC ............ A61N 1/37512; A61N 1/36585; A61N 1/3756
See application file for complete search history.

(56) References Cited

U.S. PATENT DOCUMENTS 5,271,394 A * 12/1993 Girodo ................. A61N 1/3622
607/15
9,492,668 B2 11/2016 Sheldon et al.
(Continued)

FOREIGN PATENT DOCUMENTS

EP 3218049 B1 4/2018

OTHER PUBLICATIONS

Lee J.Z. et al. Leadless pacemaker: Performance and complications, Trends in Cardiovascular Medicine, 28 (2018), pp. 130-141 (Year: 2018).*

*Primary Examiner* — Niketa Patel
*Assistant Examiner* — Adreanne A. Arnold
(74) *Attorney, Agent, or Firm* — Laurence A. Greenberg; Werner H. Stemer; Ralph E. Locher

(57) ABSTRACT

A leadless pacemaker device configured to provide for an intra-cardiac pacing includes a processing circuitry configured to generate ventricular pacing signals for stimulating ventricular activity at a ventricular pacing rate and a sensor configuration configured to receive a sense signal over a multiplicity of heart cycles. The processing circuitry is configured to derive, from signal portions of the sense signal relating to the multiplicity of heart cycles, a combined signal portion and to analyze the combined signal portion for obtaining information relating to an atrial event. The processing circuitry is configured to sum a predefined number of signal portions relating to different heart cycles to obtain the combined signal portion. The leadless pacemaker device allows, in particular, for a reliable detection of signals relating to an atrial activity and the use of such signals for controlling a ventricular pacing rate for a ventricular pacing.

9 Claims, 5 Drawing Sheets

(52) U.S. Cl.
CPC ..... *A61N 1/36564* (2013.01); *A61N 1/36578* (2013.01); *A61N 1/36592* (2013.01); *A61N 1/37512* (2017.08); *A61N 1/3756* (2013.01); *A61N 1/059* (2013.01); *A61N 1/37518* (2017.08)

(56) References Cited

U.S. PATENT DOCUMENTS

| | | |
|---|---|---|
| 9,492,669 B2 | 11/2016 | Demmer et al. |
| 9,724,519 B2 | 8/2017 | Demmer et al. |
| 9,808,628 B2 | 11/2017 | Sheldon et al. |
| 2017/0368360 A1* | 12/2017 | Hahn ................ A61N 1/36514 |
| 2018/0021581 A1 | 1/2018 | An et al. |
| 2018/0028814 A1 | 2/2018 | Ghosh |
| 2018/0085589 A1 | 3/2018 | Splett et al. |
| 2018/0361160 A1 | 12/2018 | Sheldon et al. |
| 2019/0009095 A1* | 1/2019 | Sheldon ............... A61B 5/4836 |
| 2019/0151666 A1 | 5/2019 | Bonnet |
| 2019/0168007 A1* | 6/2019 | Stahmann .......... A61N 1/36578 |
| 2019/0290918 A1* | 9/2019 | Ghosh ................. A61N 1/3714 |

\* cited by examiner

LEADLESS CARDIAC PACEMAKER DEVICE CONFIGURED TO PROVIDE INTRA-CARDIAC PACING

CROSS-REFERENCE TO RELATED APPLICATION

This application claims the benefit, under 35 U.S.C. § 119(e), of U.S. Provisional Patent Application No. 62/878,762 filed Jul. 26, 2019; the prior application is herewith incorporated by reference in its entirety.

BACKGROUND OF THE INVENTION

Field of the Invention

The present invention generally relates to a leadless cardiac pacemaker device for providing an intra-cardiac pacing, in particular a ventricular pacing. The present invention also relates to a method for operating the leadless cardiac pacemaker device.

Leadless pacemakers, in contrast to pacemakers implanted subcutaneously using leads extending transvenously into the heart, avoid leads in that the pacemaker device itself is implanted into the heart, the pacemaker having the shape of a capsule for implantation into cardiac tissue, in particular the right ventricular wall of the right ventricle. Such leadless pacemakers exhibit the inherent advantage of not using leads, which can reduce risks for the patient involved with leads transvenously accessing the heart, such as the risk of pneumothorax, lead dislodgement, cardiac perforation, venous thrombosis and the like.

Leadless pacemakers may specifically be constructed for implantation in the right ventricle and, in that case, during implantation are placed in or on the right ventricular wall. A ventricular pacing may for example be indicated in the case that a dysfunction at the AV node occurs, but the sinus node function is intact and appropriate. In such a case in particular a so-called VDD pacing may be desired, involving a ventricular pacing with atrial tracking and hence requiring a sensing of atrial activity in order to pace at the ventricle based on intrinsic atrial contractions.

A pacing using atrial tracking is in particular motivated by patient hemodynamic benefits of atrioventricular (AV) synchrony by utilizing an appropriate sinus node function to trigger ventricular pacing, potentially allowing it to maximize ventricular preload, to limit AV valve regurgitation, to maintain low mean atrial pressure, and to regulate autonomic and neurohumoral reflexes.

Publications have explored solutions which use modalities to detect mechanical events of atrial contractions, including the sensing of motion, sound and pressure. For example, U.S. Patent Application Publication No. 2018/0021581 A1 discloses a leadless cardiac pacemaker including a pressure sensor and/or an accelerometer to determine an atrial contraction timing. Since mechanical events generally exhibit a small signal volume, signal detection based on mechanical events, for example motion, sound or pressure, may be difficult to sense, in particular when the leadless pacemaker device is placed in the ventricle and hence rather far removed from the atrium of which contractions shall be sensed. In addition, wall motion and movement of blood generated by atrial contractions may not be directly translated to the ventricle, and cardiac hemodynamic signals, such as motion, heart sounds and pressure, are likely affected by external factors such as posture and patient activity.

European Patent EP 3 218 049 B1, corresponding to U.S. Pat. Nos. 9,492,668; 9,492,669; 9,724,519; and 9,808,628, describes a leadless pacemaker device that is configured for implantation in a ventricle of a heart of a patient and is configured to switch from an atrioventricular synchronous pacing mode to an asynchronous pacing mode in response to detection of one or more ventricular undersensing events.

U.S. Patent Application Publication No. 2018/0028814 A1 discloses an implantable medical device system operating in an atrial synchronized ventricular pacing mode and switching to an atrial asynchronous pacing mode when pacing mode switching criteria are met. A control circuit of the system detects a cycle length change between two atrial cycle lengths determined from a cardiac signal that includes far-field atrial triggering events. If the cycle length change is greater than a change threshold, the control circuit determines if the pacing mode switching criteria are satisfied subsequent to detecting the cycle length change.

Signals relating to an atrial activity are inherently small when received in the ventricle. This applies both to electrical signals received by a suitable electrode configuration of the leadless pacemaker device and to mechanical signals such as motion signals, pressure signals or sound signals. Considering the limitations to the reception of electrical and mechanical signals, it is challenging to provide for a reliable identification of atrial events for allowing a pacing involving an atrial tracking to control a ventricular pacing rate.

BRIEF SUMMARY OF THE INVENTION

It is accordingly an object of the invention to provide a leadless cardiac pacemaker device configured to provide intra-cardiac pacing and a method for operating the leadless cardiac pacemaker device, which overcome the hereinaforementioned disadvantages of the heretofore-known devices and methods of this general type and which allow, in particular, for a reliable detection of signals relating to an atrial activity and for the use of such signals for controlling a ventricular pacing rate for a ventricular pacing.

With the foregoing and other objects in view there is provided, in accordance with the invention, a leadless pacemaker device configured to provide for intra-cardiac pacing, comprising a processing circuitry configured to generate ventricular pacing signals for stimulating ventricular activity at a ventricular pacing rate, and a sensor configuration configured to receive a sense signal over a multiplicity of heart cycles. The processing circuitry is configured to derive, from signal portions of the sense signal relating to the multiplicity of heart cycles, a combined signal portion and to analyze the combined signal portion for obtaining information relating to an atrial event, and the processing circuitry is configured to sum a predefined number of signal portions relating to different heart cycles to obtain the combined signal portion.

Generally, signals relating to an atrial activity may be small when received by a leadless pacemaker device implanted for example in the ventricle. Sense signals herein may generally be received by an electrical sensor, such as an electrode configuration for detecting atrial activity according to intrinsic electrical signals arising in the atrium, or by a mechanical sensor, such as a motion sensor, a pressure sensor or a sound sensor, for detecting atrial activity according to mechanical events, such as mechanical motion, pressure changes or sound due to atrial activity.

A sense signal relating to an atrial event in a particular heart cycle may potentially hardly rise above noise and may be difficult to distinguish from noise. Hence, it is proposed to combine signal portions relating to multiple heart cycles in order to analyze a combined signal portion obtained from the signal portions relating to the multiple heart cycles. In such a combined signal portion, signals relating to an actual atrial event may be pronounced in comparison to noise, such that potentially an atrial event can be more easily detected and differentiated from other signal contributions.

The combining of the signal portions relating to the multiple heart cycles may in particular involve a summation of signal portions relating to different heart cycles. By summing signal portions relating to different heart cycles, such signal contributions relating to atrial activity may constructively add, whereas signal contributions relating to noise may cancel each other out in such a way that signal contributions relating to an actual atrial activity are pronounced.

The combining of signal portions relating to multiple (e.g., consecutive) heart cycles may include the combining of signal portions of a predefined number of heart cycles, for example a number anywhere between 2 to 30 heart cycles, for example 8 heart cycles. Hence, signal portions are for example summed for a predefined number of heart cycles, for example 8 heart cycles, in such a way that the combined signal portion represents a summation of signal portions relating to a predefined number of consecutive heart cycles, e.g. 8 heart cycles.

Based on the combined signal portion, then, an analysis may take place for identifying an atrial event, for example by evaluating a characteristic value of the combined signal portion, such as a positive and/or negative peak value, a positive and/or negative average value relating to signal portions above or respectively below a baseline, a peak width, or a threshold crossing. In particular, according to the combined signal portion it may be monitored whether the combined signal portion crosses a (positive or negative) threshold, in such a way that according to such threshold crossing it may be determined whether an atrial event can be identified or not.

Since the combined signal portion does not solely relate to an actual heart cycle, but involves signal portions relating to a predefined number of previous heart cycles, the determining of an atrial event based on the combined signal portion potentially does not immediately allow for a conclusion for a specific atrial event in an actual heart cycle, but at least provides an indication of the timing of atrial events and a corresponding atrial rate in a predefined number of previous heart cycles, which may allow for an atrial tracking, in particular for the determining of a timing of a ventricular pacing signal in order to stimulate a ventricular activity.

In one aspect, the processing circuitry is configured to determine the combined signal portion for each heart cycle anew. Hence, for each heart cycle a combined signal portion relating to a signal portion received for the actual heart cycle and to signal portions received for a number of previous heart cycles is computed, for example by summing the signal portions to obtain the combined signal portion. The summing herein may take place on a first-in/first-out basis, in such a way that for the actual heart cycle the combined signal portion is determined based on the signal portion for the actual heart cycle and a number of previous heart cycles. The combined signal portion for the actual heart cycle hence may be a summation expressed by the following equation:

$$S_{comb}(n) = \sum_{i=n-N+1}^{n} S(i)$$

wherein $S_{comb}(n)$ represents the combined signal portion for the $n^{th}$ heart cycle, N is the predefined number of heart cycles for which a combining shall take place, and S(i) is the signal portion for a particular heart cycle (i.e. the actual heart cycle (i=n) or a previous heart cycle).

The combined signal portion may be analyzed as such, or may be further processed, for example by applying an averaging, by applying a filtering, a rectification or the like.

The combining of the signal portions may also alternatively take place based on a moving average. For example, it is conceivable to always analyze a predetermined number of cycles (e.g. 8 cycles) and use the result until the next result is available. Or, a moving average may be formed by calculating $S_{comb}$ on a cycle by cycle basis, always removing the oldest signal and adding the latest signal.

The summing may also include a weighting. Herein, signal portions from older heart cycles may for example, within the summing, obtain a smaller weight than signal portions relating to the actual or a previous, but younger heart cycle.

The sense signal obtained by the sensor configuration may for example be an intra-cardiac electrogram obtained by an electrode configuration for detecting electrical signals, or may be a sense signal obtained from a mechanical sensor. The sense signal may be received continuously, wherein portions of the sense signal may be selected to obtain signal portions relating to multiple, different heart cycles and an atrial activity in such different heart cycles.

A windowed search strategy may be applied to derive a signal portion relating to atrial activity within a heart cycle. In particular, in one aspect, the processing circuitry is configured to obtain, based on the sense signal, a signal portion relating to a heart cycle based on a time window within the heart cycle. The time window herein may be placed within the heart cycle in relation to for example a prior ventricular event in such a way that the time window covers a time span in which an atrial event realistically may be expected.

The processing circuitry herein may be configured to adaptively set the time window for a heart cycle based on a prior ventricular event (which e.g. has been identified in the sense signal).

For example, on the occasion of the occurrence of a ventricular event, a timer of predefined length may be started. At the end of the timer—i.e., after a predefined delay time represented by the length of the timer has elapsed following a prior ventricular event—the time window is started, and within the time window a signal portion for the particular heart cycle is obtained.

The predefined delay time herein may be adaptively determined by the processing circuitry based on an actual heart rate. Generally, an atrial event can be expected at a specific timing following a prior ventricular event, in such a way that the time window for detecting an atrial event should be placed such that it is centered about the expected time of occurrence of an atrial event. For example, starting at a ventricular (pacing or intrinsic sense) event the delay time may be set in such a way that it covers a repolarization phase of the ventricle following the ventricular event. At the end of this phase the time window can be started to collect samples relating to an atrial activity.

For example, at a heart rate of 60 bpm (relating to a heart interval of 1000 ms), the delay time may be set to 800 ms, and the time window may be set to have a length of 200 ms (or slightly smaller). If the heart rate for example increases by a factor of 2 to 120 bpm (relating to a heart interval of 500 ms), the delay time may be adaptively changed to 400 ms, and the time window may be set to have a length of 100 ms.

By adaptively changing the delay time and/or the length of the time window based on an actual heart rate, it can be achieved that the time window remains centered on the (expected) time of occurrence of an atrial event. In order to combine signal portions relating to different heart cycles, herein, a scaling or interpolation technique for signal portions relating to time windows of different lengths may be applied in order to obtain signal portions having a corresponding number of samples.

In one embodiment, the sensor configuration includes at least two electrodes making up an electrode configuration for receiving an electrical sense signal indicative of an atrial activity. In this case, the sensor configuration is configured to receive electrical signals in the far field, wherein the two electrodes beneficially are located as far as possible from each other in order to allow for a reliable detection of a differential signal in between the two electrodes relating to electrical activity in the atrium.

The leadless pacemaker device may for example include a housing and a configuration of electrodes disposed on the housing for emitting pacing signals and, in addition, for receiving reception signals. The housing provides for an encapsulation of the leadless pacemaker device, the leadless pacemaker device including all required components for autarkic operation, such as the processing circuitry, an energy storage such as a battery, electric and electronic circuitry and the like, within the housing. The housing is fluid-tight such that the leadless pacemaker device may be implanted into cardiac tissue and may be kept in cardiac tissue over an extended period of time to provide for a long-time, continuous cardiac pacing operation.

In one aspect, the electrode configuration includes a first electrode disposed in the vicinity of a tip of the housing. The first electrode shall come to rest on cardiac tissue in an implanted state of the pacemaker device, in such a way that the first electrode contacts cardiac tissue at a location effective for injecting a stimulating signal into cardiac tissue for provoking a pacing action, in particular a ventricular pacing.

In one aspect, the electrode configuration includes a second electrode formed for example by an electrode ring circumferentially extending about the housing. Alternatively, the second electrode may for example be formed by a patch or another electrically conductive area formed on the housing. The second electrode is placed at a distance from the tip of the housing and hence at a distance from the first electrode disposed at the tip.

In one embodiment, the housing includes a far end opposite the tip, the electrode configuration including a third electrode disposed on the housing at the far end opposite the tip. The third electrode is operatively connected to the processing circuitry, in such a way that the processing circuitry is enabled to receive and process signals received via the third electrode.

In one aspect, the processing circuitry is configured to process, as a reception signal indicative of atrial activity, a sense signal between the first or the second electrode and the third electrode. Such signal vector arising between the first or second electrode and the third electrode may be referred to as a far-field vector, the first or second electrode and the third electrode exhibiting a rather large distance with respect to each other in such a way that a far-field differential signal may be picked up at a reasonable signal-to-noise ratio.

In one aspect, in addition or alternatively to an electrode configuration, the sensor configuration may include at least one of a motion sensor, a pressure sensor, or a sound sensor. In addition or alternatively to electrical signals, hence, due to the sensor configuration, mechanical signals may be sensed relating to a motion of heart tissue, a pressure change within the atrium and ventricle, or a sound relating to atrial activity and mechanical events due to atrial activity. A motion sensor may for example be an accelerometer for receiving an acceleration signal relating to motion in the heart. A pressure sensor may for example include a piezo-element for obtaining a measurement signal indicative of a pressure in the vicinity of the leadless cardiac pacemaker. A sound sensor may for example be a microphone.

Generally, atrial events may be detected based on different sense signals of different physical nature, wherein signals of different sensors may be individually processed and analyzed for identifying an atrial event, or may be processed and analyzed in combination in such a way that an atrial activity may be derived for example by measurements relating to electrical signals in combination with measurements relating to mechanical signals.

The leadless pacemaker device may provide for a continuous ventricular pacing at an adaptive ventricular pacing rate. In another embodiment, the leadless pacemaker device may be configured to provide a pacing in the ventricle only if no intrinsic contraction signals in the ventricle at a suitable timing can be detected. Hence, in one embodiment, the processing circuitry is configured to generate a ventricular pacing signal if no intrinsic ventricular sense signal is detected within a predefined time window following a prior ventricular event. If, instead, an intrinsic ventricular sense signal—over one or multiple cycles—is detected within the predefined time window following the prior ventricular event, no pacing signal is generated and injected, such that in that case no pacing action takes place, but the pacemaker device is in an intrinsic conduction mode without providing an artificial pacing.

With the objects of the invention in view, there is concomitantly provided a method for operating a leadless pacemaker device configured to provide for an intra-cardiac pacing, which comprises: generating, using a processing circuitry of the leadless pacemaker device, ventricular pacing signals for stimulating ventricular activity at a ventricular pacing rate; receiving, using a sensor configuration of the leadless pacemaker device, a sense signal over a multiplicity of heart cycles; deriving, using the processing circuitry, a combined signal portion from signal portions of the sense signal relating to the multiplicity of heart cycles; and analyzing, using the processing circuitry, the combined signal portion for obtaining information relating to an atrial event, wherein the combined signal portion is obtained via summing a predefined number of signal portions relating to different heart cycles using the processing circuitry.

Other features which are considered as characteristic for the invention are set forth in the appended claims.

Although the invention is illustrated and described herein as embodied in a leadless cardiac pacemaker device configured to provide intra-cardiac pacing and a method for operating the leadless cardiac pacemaker device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
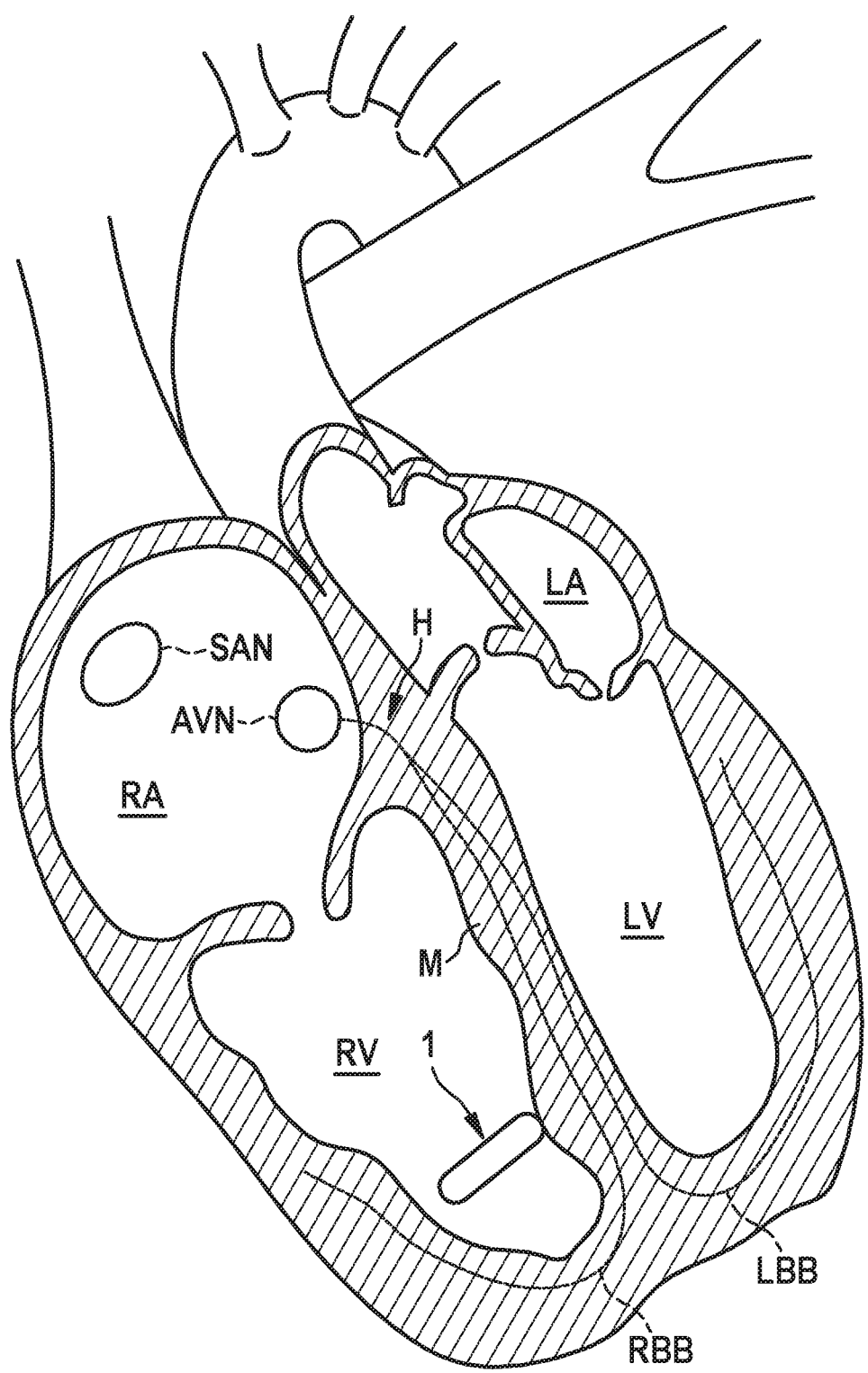
FIG. 1 is a diagrammatic, cross-sectional view of the human heart.

Subsequently, embodiments of the invention shall be described in detail with reference to the drawings. In the drawings, like reference numerals designate like structural elements.

It is to be noted that the embodiments are not limiting for the invention, but merely represent illustrative examples.

In the present disclosure it is proposed to provide a leadless pacemaker device providing for an intra-cardiac pacing, in particular a ventricular pacing.

Referring now to the figures of the drawings in detail and first, particularly, to FIG. 1 thereof, there is seen a diagrammatic view of the human heart including the right atrium RA, the right ventricle RV, the left atrium LA and the left ventricle LV, the so-called sinoatrial node SAN being located in the wall of the right atrium RA, and the sinoatrial node SAN being formed by a group of cells having the ability to spontaneously produce an electrical impulse that travels through the heart's electrical conduction system, thus causing the heart to contract in order to pump blood through the heart. The atrioventricular node AVN serves to coordinate electrical conduction in between the atria and the ventricles and is located at the lower back section of the intra-atrial septum near the opening of the coronary sinus. The so-called HIS bundle H extends from the atrioventricular node AVN. The HIS bundle H includes heart muscle cells specialized for electrical conduction and forming part of the electrical conduction system for transmitting electrical impulses from the atrioventricular node AVN via the so-called right bundle branch RBB around the right ventricle RV and via the left bundle branch LBB around the left ventricle LV.

In the case of a block at the atrioventricular node AVN, the intrinsic electrical conduction system of the heart H may be disrupted, causing a potentially insufficient intrinsic stimulation of ventricular activity, i.e., insufficient or irregular contractions of the right and/or left ventricle RV, LV. In such a case, a pacing of ventricular activity by a pacemaker device may be indicated, such pacemaker device stimulating ventricular activity by injecting stimulation energy into intra-cardiac tissue, specifically myocardium M.

Within the instant text, it is proposed to use a leadless cardiac pacemaker device 1, as diagrammatically indicated in FIG. 1, for providing for a ventricular pacing action.

Whereas common leadless pacemaker devices are constructed to sense a ventricular activity by receiving electrical signals from the ventricle RV, LV they are placed in, it may be desirable to provide for a pacing action which achieves atrioventricular (AV) synchrony by providing a pacing in the ventricle in synchrony with an intrinsic atrial activity. For such pacing mode, also denoted as atrial tracking, it is required to sense atrial activity and identify atrial events relating to atrial contractions in order to base a ventricular pacing on such atrial events.

Figure 3:
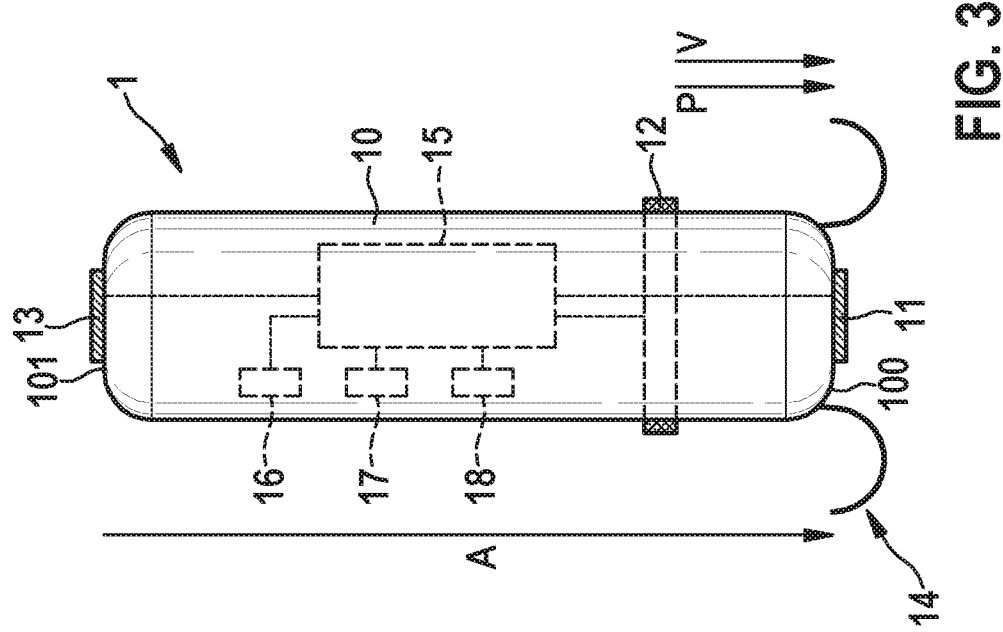
FIG. 3 is an elevational view of a leadless pacemaker device, indicating signal vectors between different electrodes of the leadless pacemaker device.
Figure 2:
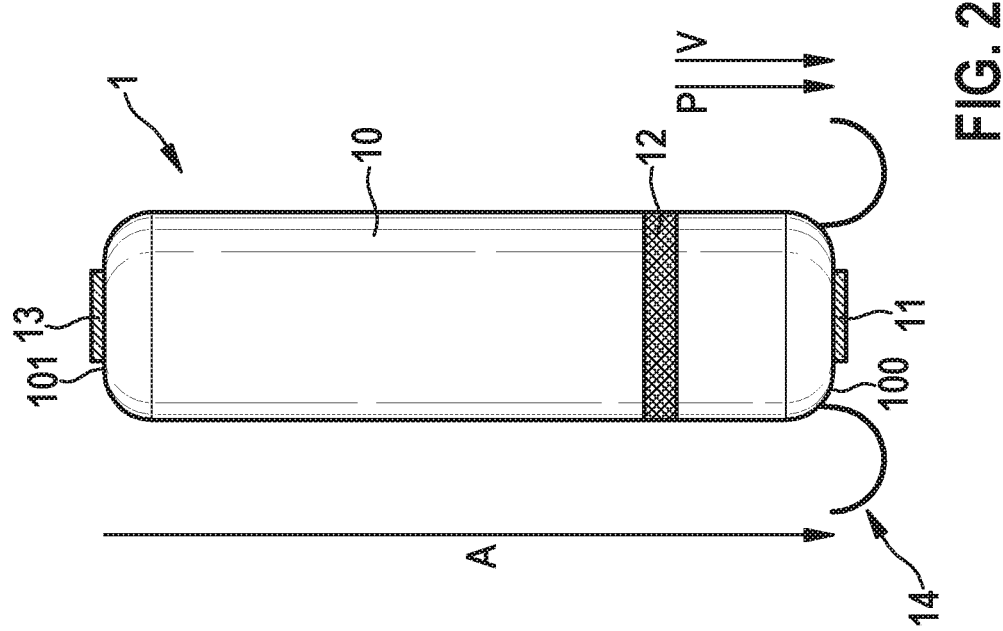
FIG. 2 is an elevational view of a leadless pacemaker device.

Referring now to FIGS. 2 and 3, in one embodiment a leadless pacemaker device 1 configured to provide for an intra-cardiac pacing, in particular employing an atrial tracking, includes a housing 10 enclosing electrical and electronic components for operating the leadless pacemaker device 1. In particular, enclosed within the housing 10 is a processing circuitry 15, including for example also a communication interface for communicating with an external device, such as a programmer wand. In addition, electrical and electronic components such as an energy storage in the form of a battery are confined in the housing 10. The housing 10 provides for an encapsulation of components received therein, the housing 10 having the shape of, e.g., a cylindrical capsule having a length of for example a few centimeters.

The leadless pacemaker device 1 is to be implanted on intra-cardiac tissue M. For this purpose, the leadless pacemaker device 1 includes, in the region of the tip 100, a fixation device 14 for example in the form of nitinol wires to engage with intra-cardiac tissue M for fixedly holding the leadless pacemaker device 1 on the tissue in an implanted state.

The leadless pacemaker device 1 does not include leads, but receives signals relating to a cardiac activity, in the illustrated embodiment, by different sensors located on or in the housing.

In particular, the leadless pacemaker device 1 in the illustrated embodiment includes an electrode configuration disposed on the housing 10 for receiving electrical signals and also for emitting stimulation signals. In the embodiment of FIGS. 2 and 3, the leadless pacemaker device 1 includes different electrodes 11, 12, 13 making up the electrode configuration and serving to emit pacing signals towards intra-cardiac tissue M for providing a pacing and to sense electrical signals indicative of a cardiac activity, in particular indicative of atrial and ventricular contractions.

A first electrode 11 herein is denoted as a pacing electrode. The first electrode 11 is placed at the tip 100 of the housing 10 and is configured to engage with cardiac tissue M.

A second electrode 12 serves as a counter-electrode for the first electrode 11, a signal vector P arising between the first electrode 11 and the second electrode 12 providing for a pacing vector for emitting pacing signals towards the intra-cardiac tissue M.

In addition, the second electrode 12 may serve as a sensing electrode for sensing signals, in particular relating to ventricular contractions, a signal vector V arising between the second electrode 12 and the first electrode 11, the signal vector V being denoted as a near-field vector.

The second electrode 12 is placed at a distance from the first electrode 11 and for example has the shape of a ring extending circumferentially about the housing 10. The second electrode 12 is for example placed at a distance of about 1 cm from the tip 100 of the housing 10 at which the first electrode 11 is placed.

The leadless pacemaker device 1, in the embodiment of FIGS. 2 and 3, in addition includes a third electrode 13 placed at a far end 101 of the housing 10, the third electrode 13 serving as a sensing electrode to sense signals indicative of cardiac activity in the far-field. In particular, a signal vector A arises between the third electrode 13 and the first electrode 11, the signal vector A being suited to pick up differential signals indicative for example of atrial contractions and being denoted as a far-field vector.

The electrodes 11, 12, 13 are in operative connection with the processing circuitry 15, the processing circuitry 15 being configured to cause the first electrode 11 and the second electrode 12 to emit a pacing signal for providing a stimulation at the ventricle. The processing circuitry 15 furthermore is configured to process signals received via the electrodes 11, 12, 13 to provide for a sensing of cardiac activity, in particular atrial and ventricular contractions.

The electrodes 11, 12, 13 make up a sensor configuration for sensing electrical signals. In particular, the pair of electrodes 11, 13 defining the far-field vector A may allow for a detection of atrial events in an electrical signal received as a differential signal between the electrodes 11, 13.

The leadless pacemaker device 1 in the embodiment of FIGS. 2 and 3—in addition or alternatively to sense electrodes as described before—includes further sensors 16, 17, 18, one sensor 16 for example being a motion sensor, in particular an accelerometer, another sensor 17 being a pressure sensor and yet another sensor 18 being a sound sensor. Through the use of such sensors 16, 17, 18 different sense signals may be received in order to allow for an identification of atrial events, hence improving the detection reliability of atrial events and increasing the stability of an atrial tracking.

Any of such sensor configurations 11, 13, 16, 17, 18 may generally be used to obtain a sense signal in order to obtain and derive information relating to an atrial activity occurring in the atrium.

Generally, in order to provide for a pacing in the ventricle using an atrial tracking, a sensing of atrial activity is required to provide for detected atrial sense markers in order to time a pacing in the ventricle in atrioventricular (AV) synchrony.

Figure 4:
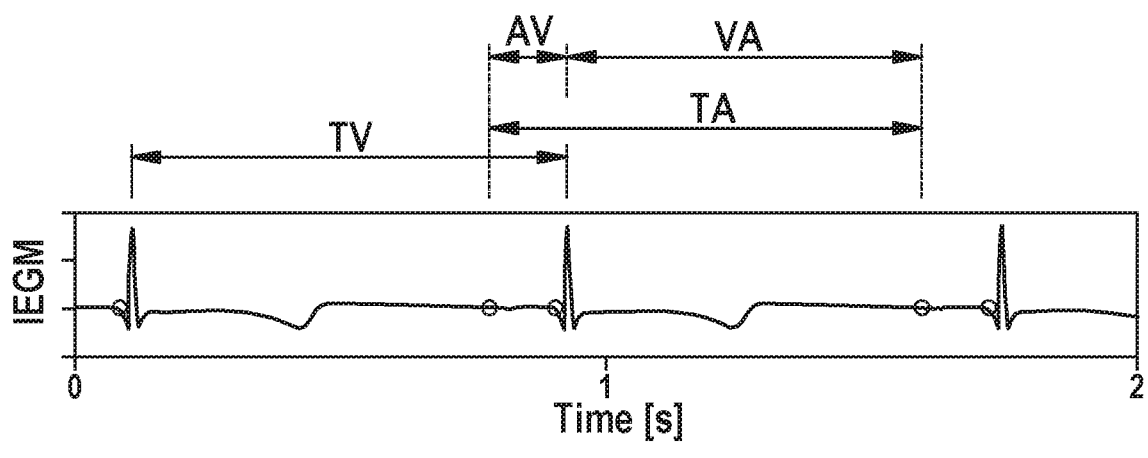
FIG. 4 is a graphical representation of an intra-cardiac electrogram (IEGM)

Referring now to FIG. 4, for example by the electrode configuration 11, 12, 13, in particular by the pair of electrodes and 11, 13 defining the far field vector A, a sense signal (e.g. an intra-cardiac electrogram IEGM) may be obtained and processed to derive atrial events As and ventricular events Vs, the atrial events As relating to a so-called P wave in the electrogram signal and the ventricular events Vs being derived from a so-called QRS wave form in the signal.

Generally, ventricular events Vs arise at a ventricular interval TV, and atrial events As arise at an atrial interval TA, wherein the ventricular interval TV and the atrial interval TA (approximately) match in the case that the ventricular rate is in synchrony with the atrial rate. A ventricular event Vs herein appears at a delay—the so-called atrioventricular delay AV—following a prior atrial event As, due to the fact that within the intrinsic conduction mechanism of the heart the atrium is caused to contract earlier than the ventricle.

As visible from FIG. 4, the amplitude of a QRS waveform associated with a ventricular event Vs is much larger than the amplitude of a P wave associated with an atrial event As. Hence, the detection of an atrial event As generally requires a processing of the signal, involving for example a filtering, in particular a bandpass filtering, a rectification and/or a windowing in order to determine, for example by monitoring a threshold crossing, whether an atrial event As occurs.

Figure 5:
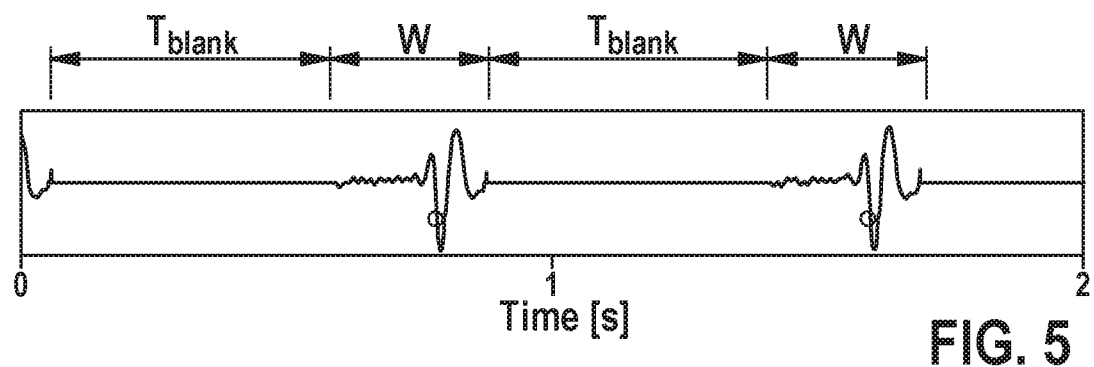
FIG. 5 is a graphical representation of a processed signal portion to derive an atrial event.

In one embodiment, as illustrated in FIG. 5, a windowed search strategy may be employed by using a search window W in which it is searched for an atrial event As. In particular, within a sense signal, for example an electrical sense signal, a search window W of a predefined width and predefined temporal position with respect to a prior ventricular event Vs may be used, the search window W being centered for example around a calculated ventricular-atrial delay VA as illustrated in FIG. 4.

The ventricular-atrial delay VA represents a time following a prior ventricular event Vs at which a next atrial event As is predicted to occur, the ventricular-atrial delay VA being computed for example from an average atrial interval TA and an average atrioventricular delay AV at which a ventricular pacing or sense event Vs has occurred after a prior atrial event As. According to the ventricular-atrial delay VA the temporal position of the window W is determined in such a way that signal portions not relating to atrial activity, in particular a QRS waveform, are excluded from a signal processing, in such a way that stronger amplitudes of signals relating to a heart activity other than an atrial activity are suppressed and do not interfere with a processing of atrial signals.

Figure 6:
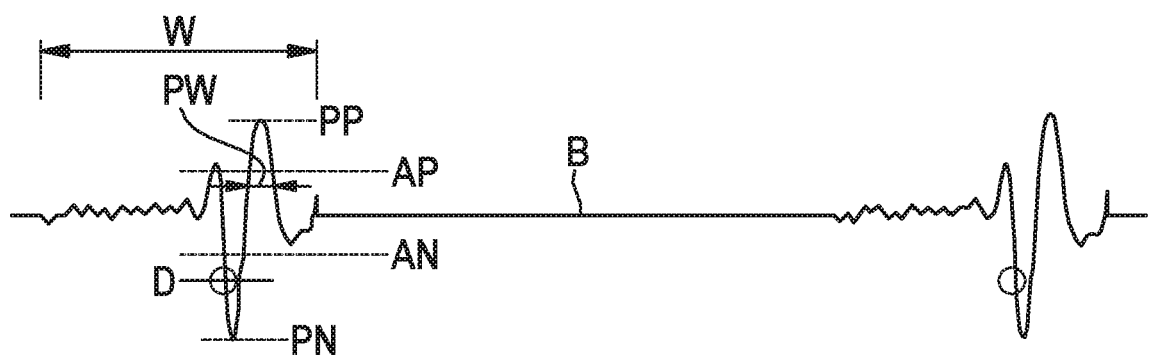
FIG. 6 is a graphical representation of a portion of the processed signal to determine characteristic values from that signal for the determination of an atrial event.

A signal sensed in this way may be generally processed as illustrated in FIG. 6. In particular, from sense signal characteristic values characterizing an atrial event As may be derived, in particular a positive peak amplitude PP, a negative peak amplitude PN, a positive average value AP relating to an average of signal portions above a baseline B, and a negative average value AN relating to negative signal portions below the baseline B. In addition, for example a pulse width PW relating to the full-width-at-half-maximum of a peak in the signal may be determined. Alternatively, or in addition a frequency analysis may be performed in order to determine an energy content of the signal in certain frequency bands.

To determine an atrial event, for example a threshold crossing of a threshold D may be monitored. Herein, for example a positive threshold and/or a negative threshold may be applied, wherein it may be found for an atrial event if either one or both of the thresholds are crossed by the signal. The thresholds herein may be adaptive and may be determined for example in dependence of other characteristic values, such as the negative peak amplitude PN or the positive peak amplitude PP.

Figure 7:
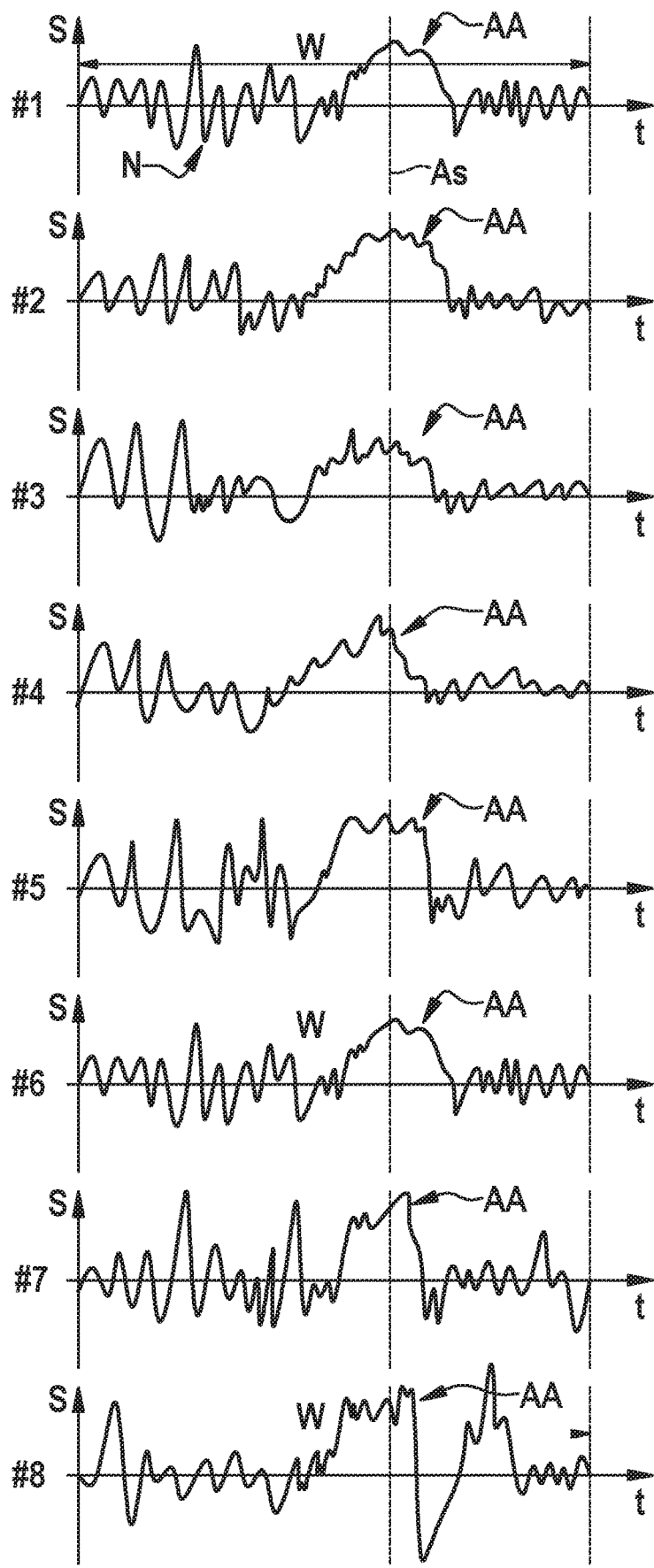
FIG. 7 includes graphs relating to signal portions including signal contributions due to atrial activity in multiple heart cycles.

As the—electrical or mechanical—signals relating to atrial activity inherently are small when received by the leadless pacemaker device 1 placed in the ventricle, a differentiation of signal contributions relating to atrial activity from other signal contributions, may be difficult. Referring now to FIG. 7 illustrating signal portions S within a time window W within eight consecutive heart cycles #1-#8, in each particular heart cycle a signal contribution relating to atrial activity AA may hardly rise above noise contributions N, such that an easy differentiation from signals relating to atrial activity AA from a noise contribution N is not possible by applying for example a simple threshold technique.

As signal contributions relating to atrial activity AA can generally be assumed to be aligned at least for a reasonable number of consecutive heart cycles (at least if conditions, for example due to physical activity, for a patient do not drastically change), it herein is proposed to combine signal portions S relating to multiple heart cycles #1-#8 to differentiate signal contributions relating to atrial activity AA from other signal contributions, in particular noise.

Figure 8:
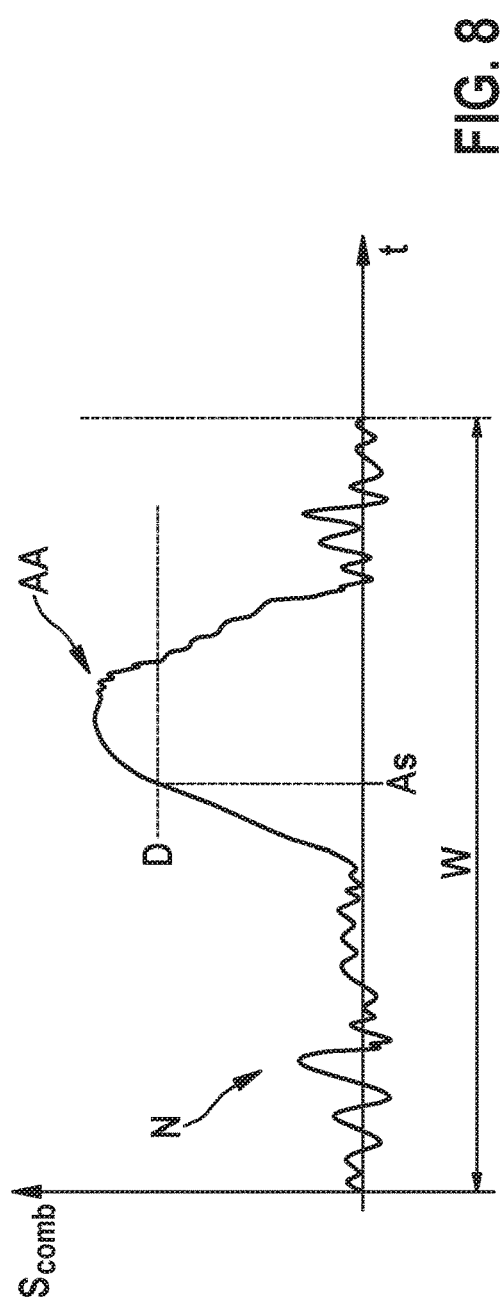
FIG. 8 is a graphical representation of a combined signal portion derived from the different signal portions of FIG. 7.

In order to provide for the combining, the signal portions S for a predefined number of heart cycles, i.e. for the actual heart cycle and a multiplicity of previous heart cycles, may be summed to obtain a combined signal portion $S_{comb}$ as illustrated in FIG. 8. Within the combined signal portion $S_{comb}$, a signal contribution relating to atrial activity AA is pronounced with respect to noise contributions N, since the signal contributions relating to atrial activity AA in the individual signal portions S relating to the heart cycles #1-#8 constructively add, whereas noise can be assumed to effectively cancel out.

The predefined number of heart cycles may be any number between for example 2 and 30, for example 8.

Since signal contributions relating to atrial activity AA are pronounced in the combined signal portion $S_{comb}$, the combined signal portion $S_{comb}$ may be analyzed for detecting an atrial event As, for example by applying a simple threshold technique, for example by comparing the combined signal portion $S_{comb}$ to a predefined threshold D as illustrated in FIG. 8. Alternatively, or in addition, any other characteristic value as indicated in FIG. 6 may be determined in order to identify an atrial event As in the combined signal portion $S_{comb}$.

For the analysis, herein, a filtering and/or a rectification of the combined signal portion may be applied prior to the identification of the atrial event As.

Since the combined signal portion $S_{comb}$ does not (solely) relate to the actual heart cycle, an identified atrial event As in the combined signal portion $S_{comb}$ does not immediately indicate an atrial event As in the actual heart cycle. Rather, atrial activity in the actual heart cycle only contributes to the combined signal portion $S_{comb}$. Nevertheless, the atrial event As determined in this way from the combined signal portion $S_{comb}$ may be used for an atrial tracking, since the identification of the atrial event As substantially relates to an averaging of the timing of atrial events As over a multiplicity of heart cycles and hence may be assumed to provide for a reliable indication of an atrial event As in a particular, actual heart cycle and an actual atrial rate.

The search window W, as illustrated in FIGS. 5 and 7, is determined based on a prior ventricular event Vs in such a way that the search window W is substantially centered about an expected time of an atrial event as following a prior ventricular event Vs. The search window W herein may be adaptively changed in its position with respect to a prior ventricular event Vs and also in its time length, as this is illustrated in FIG. 9.

In particular, for each heart cycle, the timing and length of the window W1-W3 may be individually determined and set, in such a way that the window W1-W3 is suitably placed within the heart cycle in order to cover a time range in which an atrial event As may occur.

Figure 9:
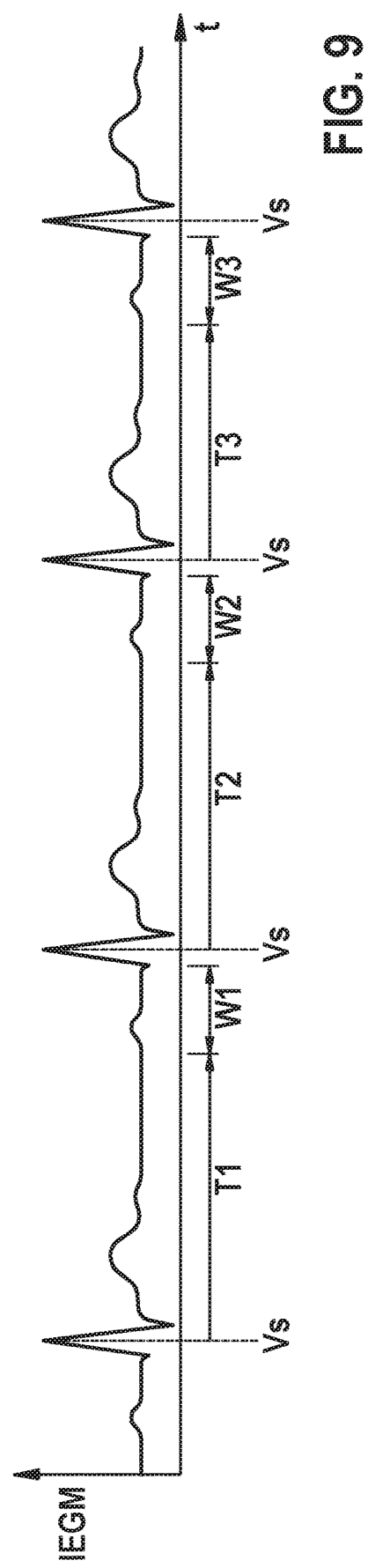
FIG. 9 is a graphical representation of a sense signal relating to multiple heart cycles and a placement of time windows to derive signal portions from the sense signal relating to multiple heart cycles.

In the example of FIG. 9, each window W1-W3 is set in relation to a prior ventricular event Vs. In particular each window W1-W3 starts at a predefined delay time T1-T3 with respect to a prior ventricular event Vs. Hence, at a particular ventricular event Vs (which may be a pacing event or an intrinsic sense event) a timer corresponding to the delay time T1-T3 and effectively covering in particular a repolarization phase of the ventricle following a prior ventricular event Vs is started. At the end of the delay time T1-T3 the window W1-W3 is started, and within the window W1-W3 signal portions are obtained relating to atrial activity within the particular heart cycle.

If the heart rate changes, the delay time T1-T3 may be proportionally adapted according to a change in the heart rate. For example, if the heart rate initially is at 60 bpm (relating to a heart interval of 1000 ms), the delay time T1-T3 may be set to 800 ms, and the window length of the window W1-W3 may be set to 200 ms. If the heart rate for example doubles to 120 bpm (relating to a heart interval of 500 ms), the delay time T1-T3 and the window length of the window W1-W3 may be proportionally adapted to 400 ms respectively 100 ms.

For combining signal portions relating to different heart cycles, for example a scaling of signal portions relating to the different windows W1-W3 may be applied in such a way that sample portions having a corresponding number of samples may suitably be summed.

It will be apparent to those skilled in the art that numerous modifications and variations of the described examples and embodiments are possible in light of the above teaching. The disclosed examples and embodiments are presented for purposes of illustration only. Other alternate embodiments may include some or all of the features disclosed herein. Therefore, it is the intent to cover all such modifications and alternate embodiments as may come within the true scope of this invention.

The following is a summary list of reference numerals and the corresponding structure used in the above description of the invention:

1 Leadless pacemaker device
10 Housing
100 Tip
101 Far end
11 First electrode (pacing electrode)
12 Second electrode (pacing ring)
13 Third electrode
14 Fixation device
15 Processing circuitry
16 Motion sensor
17 Pressure sensor
18 Sound sensor
A Atrial vector
AA Atrial activity
AN Negative average
AP Positive average
As Atrial event
AV Atrial-ventricular delay
AVN Atrioventricular node
B Baseline
D Threshold value
H HIS bundle
LA Left atrium
LBB Left bundle branch
LV Left ventricle
M Intra-cardiac tissue (myocardium)
N Noise contribution
P Pacing vector
PN Negative peak value
PP Positive peak value
PW Peak width
RA Right atrium
RBB Right bundle branch
RV Right ventricle
S Signal portion $S_{comb}$ Combined signal portion
t Time
T1-T3 Delay time
TA Atrial interval
TV Ventricular interval
$T_{blank}$ Blanking window
SAN Sinoatrial node
Ventricular vector
VA Ventricular-atrial delay
Vs Ventricular event
W, W1-W3 Search window

The invention claimed is:

1. A leadless pacemaker device configured to provide for an intra-cardiac pacing, the leadless pacemaker device comprising:
    a housing and a configuration of electrodes disposed on said housing for emitting ventricular pacing signals;
    a processing circuitry configured to generate ventricular pacing signals for stimulating ventricular activity at a ventricular pacing rate;
    an electrical sensor configured to receive a sense signal over a multiplicity of heart cycles;
    said processing circuitry configured to derive, from signal portions of said sense signal relating to the multiplicity of heart cycles, a combined signal portion and to analyze said combined signal portion for obtaining information relating to an atrial event;
    said processing circuitry configured to sum a predefined number of signal portions relating to different heart cycles to obtain said combined signal portion;
    wherein for an actual heart cycle the combined signal portion is determined based on the signal portion for the actual heart cycle and a number of previous heart cycles;
    wherein the signal portion relating to each heart cycle is obtained based on a time window within the heart cycle, and a length of the time window is adaptively changed based on an actual heart rate, the length of the time window being individually determined for each heart cycle, and proportionally adapted based on a change in heart rate from an immediately previous heart cycle;
    said processing circuitry configured to detect an atrial event by comparing said combined signal portion to a threshold; and
    said processing circuitry configured to generate ventricular pacing signals at an adapted ventricular pacing rate and/or timing of a ventricular pacing signal based on the detected atrial event and to emit the adapted ventricular pacing signals generated via the electrode configuration.

2. The leadless pacemaker device according to claim 1, wherein said processing circuitry is configured to determine said combined signal portion anew for each heart cycle.

3. The leadless pacemaker device according to claim 1, wherein said processing circuitry is configured to adaptively set said time window for a heart cycle based on a prior ventricular event.

4. The leadless pacemaker device according to claim 1, wherein a start of said time window is defined based on a predefined delay time following a prior ventricular event.

5. The leadless pacemaker device according to claim 4, wherein said predefined delay time is set based on an actual heart rate.

6. The leadless pacemaker device according to claim 1, wherein said electrical sensor includes at least two electrodes for receiving an electrical sense signal indicative of an atrial activity.

7. The leadless pacemaker device according to claim 6, wherein:
    said housing has a tip and a far end;
    said at least two electrodes including one electrode disposed in a vicinity of said tip and another electrode disposed in a vicinity of said far end; and
    said electrical sense signal being received by using said electrode in the vicinity of said tip and said electrode in the vicinity of said far end.

8. The leadless pacemaker device according to claim 1, wherein said electrical sensor includes at least one of a motion sensor, a pressure sensor or a sound sensor.

9. A method for operating a leadless pacemaker device configured to provide for an intra-cardiac pacing, the method comprising the following steps:
    generating, using a processing circuitry of the leadless pacemaker device, ventricular pacing signals for stimulating ventricular activity at a ventricular pacing rate;
    receiving, using an electrical sensor of the leadless pacemaker device, a sense signal over a multiplicity of heart cycles;
    deriving, using the processing circuitry, a combined signal portion from signal portions of the sense signal relating to the multiplicity of heart cycles;
    analyzing, using the processing circuitry, the combined signal portion for obtaining information relating to an atrial event;
    obtaining, using the processing circuitry, the combined signal portion by summing a predefined number of signal portions relating to different heart cycles;
    wherein for an actual heart cycle the combined signal portion is determined based on the signal portion for the actual heart cycle and a number of previous heart cycles;
    wherein the signal portion relating to each heart cycle is obtained based on a time window within the heart cycle, and a length of the time window is adaptively changed based on an actual heart rate, the length of the time window being individually determined for each heart cycle, and proportionally adapted based on a change in heart rate from an immediately previous heart cycle;
    comparing the combined signal portion to a threshold, using the processing circuitry, to detect an atrial event; and
    generating ventricular pacing signals at an adapted ventricular pacing rate and/or timing of a ventricular pacing signal based on the detected atrial event and emitting the adapted ventricular pacing signals generated via an electrode configuration of the leadless pacemaker device.

* * * * *